(12) United States Patent
de Lima et al.

(10) Patent No.: US 10,447,999 B2
(45) Date of Patent: Oct. 15, 2019

(54) ALIGNMENT OF IMAGES OF A THREE-DIMENSIONAL OBJECT

(71) Applicant: Hewlett-Packard Development Company, L.P., Houston, TX (US)

(72) Inventors: Diogo S. de Lima, Neward, CA (US); Divya Sharma, Palo Alto, CA (US); Dante Dibenedetto, Palo Alto, CA (US); Ilya Gerasimets, Palo Alto, CA (US); Arsenii Saranin, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 150 days.

(21) Appl. No.: 14/918,213

(22) Filed: Oct. 20, 2015

(65) Prior Publication Data

US 2017/0109888 A1    Apr. 20, 2017

(51) Int. Cl.
*G06K 9/00*       (2006.01)
*H04N 13/257*   (2018.01)
*G06T 17/00*    (2006.01)
*G06T 7/30*     (2017.01)
(Continued)

(52) U.S. Cl.
CPC .......... *H04N 13/257* (2018.05); *G01S 17/00* (2013.01); *G06T 3/0075* (2013.01); *G06T 7/30* (2017.01); *G06T 17/00* (2013.01); *G06T 2200/08* (2013.01); *G06T 2207/10016* (2013.01); *G06T 2207/10024* (2013.01); *G06T 2207/10028* (2013.01)

(58) Field of Classification Search
None
See application file for complete search history.

(56) References Cited

U.S. PATENT DOCUMENTS 5,582,705 A * 12/1996 Yeung .............. G01N 27/44721
                                                              204/452
6,970,591 B1 * 11/2005 Lyons ................... G06K 9/209
                                                              345/419
(Continued)

OTHER PUBLICATIONS

Global Non-Rigid Alignment of 3-D ScansACM Transactions on Graphics (Proc. SIGGRAPH), Aug. 2007Benedict Brown, Szymon Rusinkiewicz (Year: 2007).*
(Continued)

*Primary Examiner* — Iman K Kholdebarin
(74) *Attorney, Agent, or Firm* — Brooks Cameron & Huebsch PLLC (US LC)-USD (57) ABSTRACT

In one example implementation, a system for aligning of images of a three-dimensional (3D) object includes a select engine to select a first image and a second image from a sequence of images of a 3D object taken at different object orientations from a capture cycle of a scanner, a combine engine to combine first metadata from the first image and second metadata from the second image to form combined metadata, an orientation engine to select a third image from the sequence of images, where the third image is from an opposite object orientation relative to a first object orientation of the first image or a second object orientation of the second image, and an align engine to align the sequence of images based on the combined metadata and third metadata from the third image.

15 Claims, 4 Drawing Sheets

(51) Int. Cl.
*G06T 3/00* (2006.01)
*G01S 17/00* (2006.01)

(56) References Cited

U.S. PATENT DOCUMENTS

| | | | |
|---|---|---|---|
| 8,363,930 B1* | 1/2013 | Francis, Jr. | G06K 9/00214 382/154 |
| 9,773,302 B2* | 9/2017 | Wang | G06T 7/0002 |
| 2005/0280644 A1* | 12/2005 | Ikezawa | G06T 15/04 345/419 |
| 2008/0259073 A1* | 10/2008 | Lowe | G06T 15/20 345/419 |
| 2012/0306876 A1* | 12/2012 | Shotton | G06T 17/10 345/424 |
| 2013/0051647 A1* | 2/2013 | Miao | G06T 7/344 382/132 |
| 2014/0055570 A1* | 2/2014 | Dehais | G06T 17/20 348/47 |
| 2014/0085429 A1* | 3/2014 | Hebert | G01S 5/163 348/46 |
| 2014/0125658 A1* | 5/2014 | Bell | H04N 13/0203 345/419 |
| 2014/0211925 A1* | 7/2014 | Dong | A61B 6/585 378/207 |
| 2014/0212832 A1* | 7/2014 | Fisker | A61B 5/0062 433/29 |
| 2015/0160348 A1* | 6/2015 | Zweigle | G09B 29/004 356/607 |
| 2015/0163402 A1* | 6/2015 | Frueh | G06T 15/205 348/37 |
| 2015/0363971 A1* | 12/2015 | Pan | G06T 17/00 345/420 |
| 2016/0005228 A1* | 1/2016 | Niebla, Jr. | H04N 13/0022 348/43 |
| 2016/0125638 A1* | 5/2016 | Grimaud | G06T 15/04 348/169 |
| 2016/0163115 A1* | 6/2016 | Furst | G06T 19/20 433/29 |
| 2017/0079622 A1* | 3/2017 | O'Donnell | A61B 5/0035 |
| 2017/0085863 A1* | 3/2017 | Lopez | H04N 13/0022 |
| 2017/0109888 A1* | 4/2017 | de Lima | G06T 17/00 |

OTHER PUBLICATIONS

Gelfand, "Feature Analysis and Registration of Scanned Surfaces", Ph.D Dissertation, Stanford University, 2006, 1 page.
Global Non-Rigid Alignment of 3-D Scans Benedict J. Brown Szymon Rusinkiewicz.
https://www.youtube.com/watch?v=k56GrxoSSxA.

* cited by examiner

ALIGNMENT OF IMAGES OF A THREE-DIMENSIONAL OBJECT

BACKGROUND

Three-dimensional (3D) scanning is useful for analyzing a real world object and constructing a digital model of that object. For example, 3D scanning may be used for digital productions such as movies and video games and/or in industrial design, prototyping, and/or quality control applications, among other applications.

DETAILED DESCRIPTION

Three-dimensional (3D) scanning can include taking images of a 3D object with a scanner. Such images can be combined in a manner to form a 3D computer model of the 3D object. However, alignment of the images with respect to each other to form a 3D model of the 3D object can be time and/or resource consuming. Moreover, an undesired alignment may result when insufficient amounts of shared geometry exist between images of a 3D object, among other possibilities. Undesired alignment of the images may result in a 3D model that does not accurately reflect a size, color, texture, shape, or other characteristic of the 3D object. As such, it may be desirable to align images of a 3D object in an efficient and accurate manner.

Examples of the disclosure include systems and methods suitable to align images of a 3D object. Aligning of images of a 3D object in an example includes a select engine to select a first image and a second image from a sequence of images of a 3D object taken at different object orientations (i.e., a 3D object orientation) from a capture cycle of a scanner, a combine engine to combine first metadata from the first image and second metadata from the second image to form combined metadata, an orientation engine to select a third image from the sequence of images, where the third image is from an opposite object orientation relative to a first object orientation of the first image or a second object orientation of the second image, and an align engine to align the sequence of images based on the combined metadata and third metadata from the third image.

Figure 1:
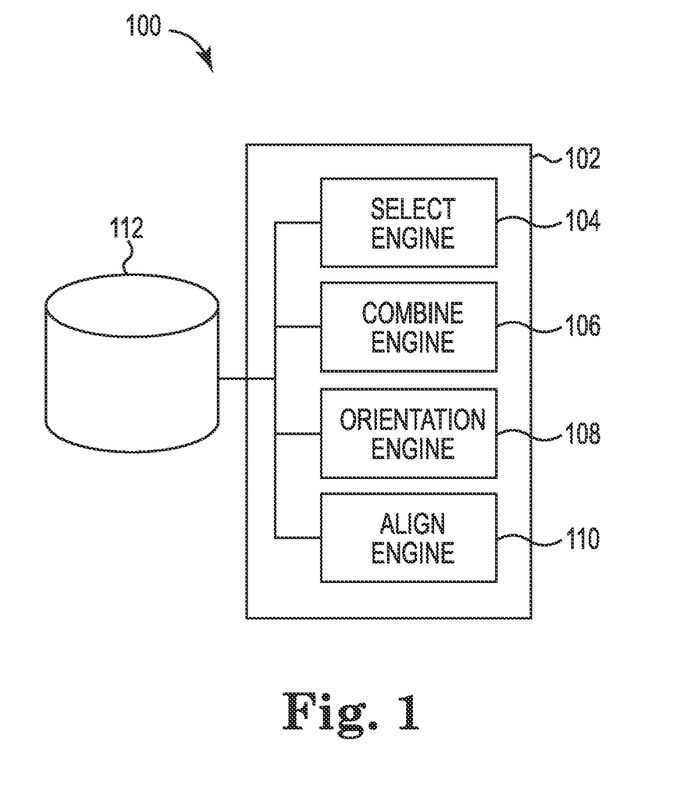
FIG. 1 illustrates a diagram of an example of a system suitable with alignment of images of a 3D object consistent with the disclosure.

As used herein, a 3D object can be an object about which alignment of images of a 3D object can be performed. For example, a 3D object can be an object that can be scanned by a scanner such as those described herein. As a further example, a 3D object can be an object that has a height, width, and depth as a first, second, and third dimension. As used herein, a scanner can be a device that analyzes a real-world object (e.g., a 3D object) to collect data about its shape and/or appearance. The scanner can be a device with an attached camera, reader, projector, light source, and/or other suitable devices or combinations thereof. The scanner can be used to capture and transmit a images of the 3D object FIG. 1 illustrates a diagram of an example of a system 100 suitable with alignment of images of a 3D object consistent with the disclosure The system 100 can include a database 112, a select engine 102, and/or a plurality of engines (e.g., select engine 102, combine engine 106, orientation engine 108, align engine 110). The select engine 102 can be in communication with the database 112 via a communication link, and can include the plurality of engines (e.g., select engine 102, combine engine 106, orientation engine 108, align engine 110). The select engine 102 can include additional or fewer engines that are illustrated to perform the various elements described herein.

The plurality of engines (e.g., select engine 102, combine engine 106, orientation engine 108, align engine 110) can include a combination of hardware and machine readable instructions (e.g., stored in a memory resource such as a non-transitory machine readable medium) that are executable using hardware components such as a processor, but at least hardware, to perform elements described herein (e.g., combine first metadata from a first image and second metadata from a second image to form combined metadata, etc.).

A receive engine (not illustrated) can receive images of a 3D object from a scanner. The images can be in a sequence of images of a 3D object taken at different object orientations from a capture cycle of a scanner. As used herein, a capture cycle of a scanner can be a process of acquiring images (e.g., one image, or more than one image) of an object (e.g., a 3D object) by the scanner, where the 3D object is rotated within a single plane by a known rotation angle and a known tilt.

The images received from the scanner can include image data of the 3D object and image data of a background. Although described as receiving images of a 3D object from the scanner the disclosure is not so limited. For example, the receive engine can receive one image from a capture cycle of a scanner that includes image data of a 3D object and/or image data of a background (e.g., located behind and/or around the 3D object and within a frame of the image of the 3D object). The background image data can be separated from the 3D object image data.

The select engine 102 can include hardware and/or a combination of hardware and machine readable instructions, but at least hardware, to select a first image and a second image from a sequence of images of a 3D object taken at different object orientations from a capture cycle of a scanner. As used herein, an image of the 3D object can include point clouds, a depth map and/or color information, among other information. For example, a capture cycle can include captured point clouds and color information related to the 3D object, as well as point clouds and color information related to the background, among other information.

A depth map can be utilized to generate a point cloud. As used herein, a point cloud can be a set of data points in a coordinate system. For example, a point cloud can be a set of data points in a three-dimensional coordinate system (e.g., X, Y, and Z coordinates). A point cloud can represent the external surface of an object (e.g., the 3D object) that a device (e.g., a scanner) has measured. For example, the 3D object can be represented by a set of data points included in a point cloud or a plurality of point clouds, where the point clouds include coordinate information for the set of data points.

Point clouds can be extracted from depth maps of the images of the 3D object. The images of the 3D object including depth maps can be received from the depth-sensing camera of the scanner and/or depth can be generated from red, green, and blue (RGB) images using a structured light pattern projected by a projector. As used herein, a depth map is an image that includes information relating to the distance of surfaces of an object (e.g., a 3D object) from a viewpoint of a device (e.g., a scanner).

Color information can be received from the RGB camera of the scanner. Color information can refer to a visual property of the 3D object. For example, color information can refer to a color of the 3D object (e.g., blue, red, yellow, etc.) As another example color information can refer to a color characteristic of the 3D object (e.g., bright, dark, etc.) Although color information is described as referring to a color and/or a color characteristic of the 3D object, examples of the disclosure are not so limited. Color information can be utilized to determine material characteristics of the 3D object, as described herein.

Selection can be based on various characteristics of images such point clouds generated from the images and/or metadata of the images. For example, a first image and a second image can be selected from a sequence of images as two images included in the sequence of images that have a desired alignment (e.g., using a comparatively least amount of rotation of a point cloud to reach a desired of alignment between point clouds) based on alignment of a point cloud of the first image with alignment of a point cloud with the second image and/or with alignment to a point cloud of another image included in the sequence of images.

Notably and in contrast to other approaches attempting to align images of a 3D object, alignment of images of a 3D object as described herein, does not sequentially align each image of the sequence of images (i.e., brute force alignment of each image of an entire capture cycle) and instead aligns an image of the sequence of images based on combined metadata and metadata to promote efficient and accurate alignment of the sequence of images. Moreover, alignment of images of a 3D object as described herein reduces and/or eliminates occlusions that may not be accounted for by other approaches attempting to align images.

Each image from the sequence of images includes respective metadata. Such metadata can include information about a 3D object position relative to a scanner, image capture conditions for a particular image, camera settings of the scanner, among other information. Examples of metadata can include target folder, RotationAngleProvided, RotationAngleYaw, RotationAnglePitch, RotationAxisProvided, RotationAxisX, RotationAxisY, RotationAxisZ, Quality, TurnTableUsage, EngineScanOutput, Timestamp, BaseObjFile, BaseMatFile, BaseTexFile, MergedObjFile, Homography, 3DCalibration, among other types of metadata The combine engine 106 can include hardware and/or a combination of hardware and machine readable instructions, but at least hardware, to combine first metadata from the first image and second metadata from the second image to form combined metadata. Combined metadata provides comparatively greater information about the 3D object than either the first metadata or the second metadata alone provides and thereby promote efficient and accurate alignment of the sequence of images, as described herein. For example, the combined metadata can include metadata representative of respective geometries of the 3D object as viewed from the first object orientation and the second object orientation, among other combined information. Use of combined metadata can promote reduction or elimination of occlusions as viewed from the first object orientation or the second object orientation, especially when the combined metadata is employed in combination with additional metadata from an opposite object orientation relative to the first object orientation or the second object orientation, as described herein.

The orientation engine 108 can include hardware and/or a combination of hardware and machine readable instructions, but at least hardware, to select a third image from the sequence of images, where the third image is from an opposite object orientation relative to a first object orientation of the first image or a second object orientation of the second image. In some examples, an opposite object orientation is about 180 degrees of rotation along a capture cycle from a first object orientation or the second object orientation. As mentioned, having the opposite object orientation about 180 degrees of rotation along a capture cycle from a first object orientation or the second object orientation and/or otherwise opposite from the first object orientation or the second object orientation can promote efficient and accurate alignment of the sequence of images. The capture cycle can, in some examples, include a sequence of at least six different object orientations. For instance, a total number of object orientations included in the capture cycle can be an even number (e.g., six or eight, etc.). In some examples, a first object orientation can be different than a second object orientation.

Selection by the orientation engine 108 of the opposite object orientation relative to a first object orientation of the first image or a second object orientation of the second image can be based upon various characteristics of images such point clouds generated from the images and/or metadata of the images. For examples, the orientation engine 108 can compare a degree of calibration (e.g., a particular amount a rotation and/or translation of a point cloud) to align a point cloud from an object orientation opposite to a point cloud of the first object orientation to a degree of calibration to align a point cloud from an object orientation opposite to a point cloud of the second object orientation. Such comparison or other type of comparison by the orientation engine 108 can promote selection of either the opposite object orientation relative to a first object orientation or the opposite object orientation relative to of the second object orientation.

The align engine 110 can include hardware and/or a combination of hardware and machine readable instructions, but at least hardware, to align the sequence of images based on the combined metadata and third metadata from the third image. As used herein, a pair of metadata refers to combined metadata and metadata of the third image. In some examples, the instruction to align can include instruction to rotate and/or translate a point cloud of an image of the sequence of images by a rotation matrix determined based on the combined metadata and the metadata of the third image. Aligning can include using a unique rotation angle corresponding to each different object orientation, as described herein. Utilizing a pair of metadata that includes combined metadata and metadata from the opposite object orientation can reduce or eliminate of occlusions as viewed from the first object orientation or the second object orientation and thereby promote accurate and efficient alignment and/or generation of a 3D model of the 3D object.

A model engine (not illustrated) can include hardware and/or a combination of hardware and machine readable instructions, but at least hardware, to generate a 3D model of the 3D object using the aligned sequence of images. For example, a 3D model of the 3D object can be generated using a sequence of images of the 3D object from the capture cycle of the scanner in response to alignment of the sequence of images by the align engine 110, among other possibilities.

Generating the 3D model of the 3D object can include removing the background image data and/or depth data from the sequence of images. For example, background image data (e.g., image data corresponding to a surface on which the 3D object was placed during the capture cycle) can be removed such that 3D object image data remains without the background data.

Generating the 3D model of the 3D object and/or various other functions such as selecting by the selection engine 104, combination by the combine engine 106, orientation by the orientation engine 108, and/or alignment by the align engine 110 can include extracting point clouds from image data of 3D object from a sequence of images corresponding to each different object orientation taken during a capture cycle directed at the 3D object. Point clouds corresponding to each different object orientation can be extracted from images. A point cloud can be extracted from each image of the 3D object at each object orientation (e.g., a first object orientation, a second object orientation, a third object orientation etc.)

The database 112 can include digital information relating to the 3D object. The database 110 can be utilized to store digital representations (e.g., a 3D model) of the 3D object, image data (e.g., of a 3D model), and/or cached metadata of images, among other information. For example, a 3D model can include image data (e.g., point clouds, color information, or both).

Figure 2:
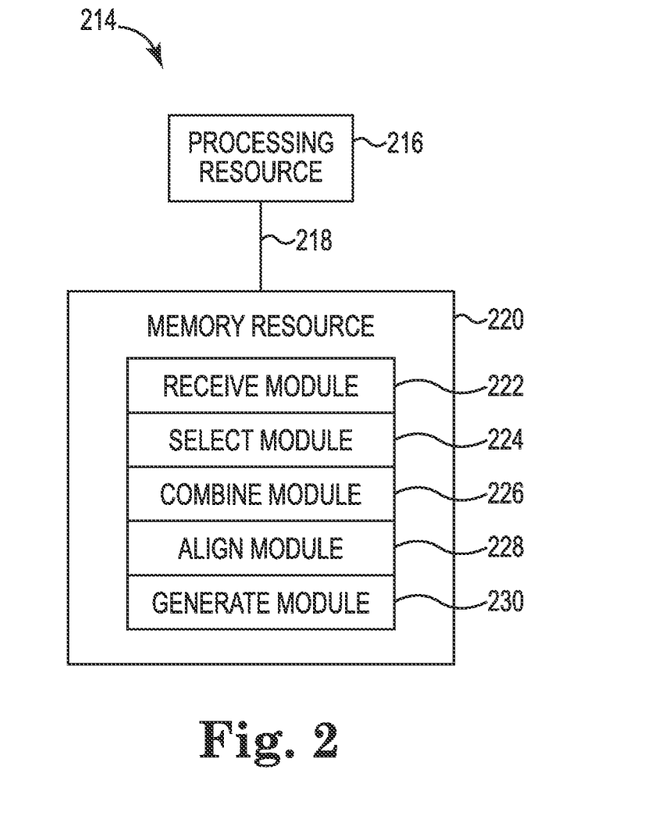
FIG. 2 illustrates a diagram of an example of a computing device suitable with alignment of images of a 3D object consistent with the disclosure.

FIG. 2 illustrates a diagram of an example of a computing device 214 suitable with alignment of images of a 3D object consistent with the disclosure. The computing device 214 can include hardware, machine readable instructions on a non-transitory machine readable medium, or a combination thereof, to perform the elements described herein.

The computing device 214 can be a combination of hardware and machine readable instructions to share information. The hardware, for example, can include a processing resource 216 and/or a memory resource 220 (e.g., computer-readable medium (CRM), machine readable medium (MRM), database, etc.).

A processing resource 216, as used herein, can include a number of processors capable of executing instructions stored by a memory resource 220. Processing resource 216 can be implemented in a single device or distributed across multiple devices. The machine readable instructions (e.g., computer readable instructions (CRI)) can include instructions stored on the memory resource 220 and executable by the processing resource 216 to implement a desired element (e.g., receive a sequence of images of a 3D object taken at different object orientations from a capture cycle of a scanner, select a first image and a second image from a sequence of images, combine metadata of the first image with metadata of the second image to form combined metadata, select a third image from the sequence of images from an opposite object orientation relative to a first object orientation of the first image or a second object orientation of the second image, align an image of the sequence of images based on the combined metadata and metadata of the third image, generate at least a portion of a 3D model of the 3D object using the aligned sequence of images, etc.).

The memory resource 220 can be in communication with a processing resource 216. A memory resource 220, as used herein, can include a number of memory components capable of storing instructions that can be executed by processing resource 216. Such memory resource 220 can be a non-transitory CRM or MRM. Memory resource 220 can be integrated in a single device or distributed across multiple devices. Further, memory resource 220 can be fully or partially integrated in the same device as processing resource 216 or it can be separate but accessible to that device and processing resource 216. Thus, it is noted that the computing device 214 can be implemented on a device and/or on a combination of devices.

The memory resource 220 can be in communication with the processing resource 216 via a communication link (e.g., a path) 218. The communication link 218 can be local or remote to a machine (e.g., a computing device) associated with the processing resource 216. Examples of a local communication link 218 can include an electronic bus internal to a machine (e.g., a computing device) where the memory resource 220 is one of volatile, non-volatile, fixed, and/or removable storage medium in communication with the processing resource 216 via the electronic bus.

A plurality of modules (e.g., a receive module 222, a select module 224, combine module 226, align module 228, generate module 230, etc.) can include CRI that when executed by the processing resource 216 can perform elements. The plurality of modules (e.g., receive module 222, select module 224, combine module 226, align module 228, generate module 230) can be sub-modules of other modules. For example, the select module 224 and the combine module 226 can be sub-modules and/or contained within the same computing device. In another example, the plurality of modules (e.g., receive module 222, select module 224, combine module 226, align module 228, generate module 230) can be individual modules at separate and distinct locations (e.g., CRM, etc.).

Each of the plurality of modules (e.g., receive module 222, select module 224, combine module 226, align module 228, generate module 230) can include instructions that when executed by the processing resource 216 can function as a corresponding engine as described herein. For example, the receive module 222 can include instructions that when executed by the processing resource 216 can function as the receive engine (not illustrated). In another example, the select module 224 can include instructions that when executed by the processing resource 216 can function as the select engine 104. In another example, the combine module 226 can include instructions that when executed by the processing resource 216 can function as the combine engine 106. In another example, the align module 228 can include instructions that when executed by the processing resource 216 can function as the align engine 110. In another example, the generate module 230 can include instructions that when executed by the processing resource 216 can function as the generate engine (not illustrated).

Figure 3:
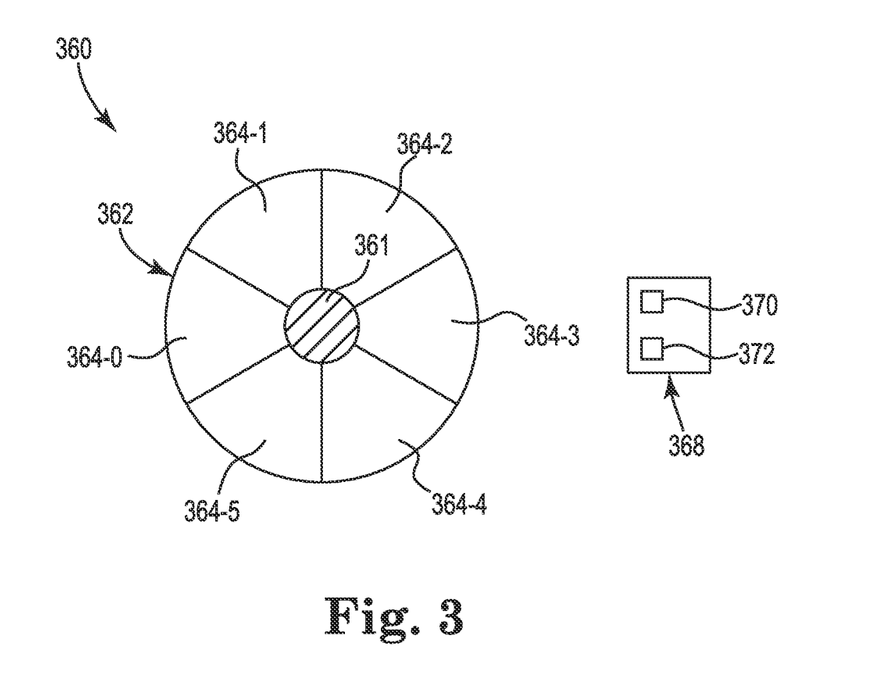
FIG. 3 illustrates an example of an environment suitable with alignment of images of a 3D object with the disclosure.

FIG. 3 illustrates an example of an environment 360 suitable with alignment of images of a 3D object consistent with the disclosure. As illustrated in FIG. 3, the environment 360 can include a scanner 368, a 3D object 361, and a surface 362 on which the 3D object can be positioned.

The scanner 368 can be a device that analyzes the 3D object 361 to collect data about the shape and/or appearance of the 3D object 361. For example, the scanner 368 can be a structured light scanner. As used herein, a structured light scanner can be a scanner which projects a pattern of light onto a 3D object to examine the deformation of the projected light pattern by the 3D object. For example, the structured light scanner can be a combination of a camera and projector, where the projector projects a pattern of light onto a 3D object and the camera captures deformation of the projected light pattern by the 3D object. For instance, the structured light scanner may project black and white patterns onto a 3D object to examine the deformation of the black and white patterns. A plurality of cameras included in the scanner can examine the shape of the patterns and calculate the distance of every point in the plurality of cameras' respective fields of view.

For example, the scanner 368 may include a depth-sensor camera 370 and a RGB camera 372. As used herein, a depth-sensor camera can be a camera that utilizes a pattern of light from a structured light to capture a depth map image of a 3D object. A depth-sensor camera can be used to determine a size and contour of the 3D object. For example, a depth-sensor camera can be used to determine a size of the 3D object and/or a contour of the 3D object.

As used herein, a RGB camera can be a camera that utilizes a plurality of charge-coupled device (CCD) sensors to acquire color signals (e.g., red, green, and blue) of the 3D object. An RGB camera can be used to acquire material characteristics of the 3D object. For example, an RGB camera can be used to determine whether the 3D object and/or parts of the 3D object, are a certain color, brightness, etc.

The scanner 368 may utilize both the depth-sensor camera 370 and the RGB camera 372 together to determine other material characteristics. For example, depth and color can be measured by the depth-sensor camera and the RGB camera, respectively, to determine material characteristics such as whether the 3D object 361 and/or parts of the 3D object are too shiny or are transparent, among other possibilities.

The surface 362 on which the 3D object can be positioned can be rotatable so as to rotate the 3D object through a capture cycle. For instance, the surface 362 can be a turn table. As used herein, a turn table can be a mechanically operated device that rotates the 3D object by a specified rotation angle. For example, the turn table may rotate the 3D object during the capture cycle of the scanner. In some examples, the 3D object can be placed on a turn table having a background.

The images of the 3D object can be captured at a plurality of orientations 364-1, 364-2, 364-3, 364-4, 364-5, . . . , 364-0 of the 3D object as a sequence of images. For example, the 3D object can be captured by a first image (e.g., one image) at a zero orientation. The 3D object may then be rotated (e.g., by a turn table) and captured by a second image (e.g., one image at a first object orientation (e.g., 30 degrees) relative to the zero orientation. The 3D object may again be rotated and captured by a third image (e.g., one image) at a third object orientation (e.g., 60 degrees) relative to the zero orientation. In some examples, a total number of object orientations in a capture cycle can be six, as illustrated in FIG. 3. Although the disclosure describes one image at each object orientation the disclosure is not so limited. For example, a total number of images at each object orientation may include more or less images and/or a total number of object orientations can be varied (e.g., eight object orientations for a given capture cycle) to promote alignment of images of a 3D object.

Notably, a first image and a second image, as used herein, can be from adjacent object orientations (e.g., 364-2 and 364-3). As mentioned, having the first image and the second image from adjacent object orientation can promote combining first metadata of the first image with second metadata of the second image. Moreover, having an opposite object orientation (e.g., 364-5 or 364-0) about 180 degrees of rotation along a capture cycle from a first object orientation (e.g., 364-2) or the second object orientation (364-3) can promote efficient and accurate alignment of the sequence of images while accounting for occlusions.

The images of the 3D object can be captured at each different orientation (e.g., six different orientations) of a capture cycle. The object orientations of the 3D object can be based on unique rotation angles of the 3D object relative to the scanner. The different object orientations reflected in the images of the 3D object can correspond to a different rotation angle of the 3D object relative to the scanner. For example, a zero orientation of the 3D object can be associated with a rotation angle of 0 degrees relative to the scanner. Additionally, a first orientation of the 3D object can be associated with a rotation angle of 30 degrees relative to the scanner, a second orientation of the 3D object can be associated with a rotation angle of 60 degrees relative to the scanner, and a third orientation of the 3D object can be associated with a rotation angle of 90 degrees relative to the scanner. A turn table may rotate the 3D object to each rotation angle during the capture cycle of the scanner.

Although described as having rotation angles of 0 degrees, 30 degrees, 60 degrees, and 90 degrees relative to the camera, respectively, examples of the disclosure are not so limited. For example, rotation angles can be various other angles (e.g., 0 degrees, 45 degrees, 90 degrees).

Figure 4:
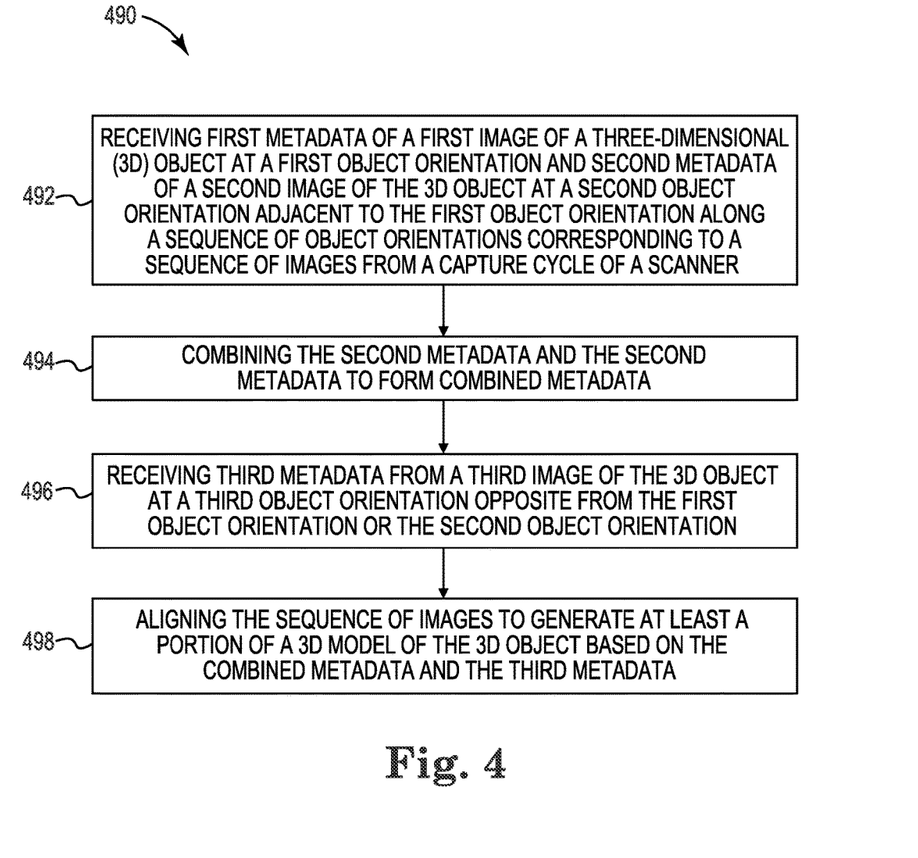
FIG. 4 illustrates a flow chart of an example of a method of alignment of images of a 3D object consistent with the disclosure.

FIG. 4 illustrates a flow chart of an example of a method of alignment of images of a 3D object consistent with the disclosure. For example, method 490 can be performed by a computing device (e.g., computing device 214 previously described in connection with FIG. 2) to align images of a 3D object.

As illustrated at 492, the method 490 can include receiving first metadata of a first image of a 3D object at a first object orientation and second metadata of a second image of the 3D object at a second object orientation adjacent to the first object orientation along a sequence of object orientations corresponding to a sequence of images from a capture cycle of a scanner, as described herein. Receiving can include parsing metadata and/or retrieving metadata from memory (e.g., cached metadata), among other suitable methods of receiving metadata to promote alignment of images of a 3D object.

As illustrated at 494, the method 490 can combining the second metadata and the second metadata to form combined metadata, as described herein. The method 490 can include receiving third metadata from a third image of the 3D object at a third object orientation opposite from the first object orientation or the second object orientation, as illustrated at 496. As illustrated at 498, the method 490 can include aligning the sequence of images to generate at least a portion of a 3D model of the 3D object based on the combined metadata and the third metadata.

In some examples, the method 490 can include generating a 3D model of the 3D object using an aligned sequence of images. Generating can include removing the background image data from the images. For example, the background image data (e.g., image data corresponding to a surface on which the 3D object was placed during the capture cycle) can be removed such that the 3D object image data and not the background data remains.

Generating the 3D model of the 3D object can include extracting point clouds from the image data of the 3D object of images corresponding to each different object orientation. Point clouds corresponding to each different object orientation can be extracted from the images. A point cloud can be extracted from each image of the 3D object at each object orientation (e.g., zero orientation, first orientation, second orientation, etc.)

Aligning the point clouds from the images corresponding to each different object orientation can include rotating the point clouds corresponding to each of the images by a unique rotation angle. In some examples, the point clouds corresponding to the images can be rotated using a Point Cloud Library (PCL). As used herein, a PCL can be a library of computer readable instructions to associate with point cloud processing tasks. A PCL can be used to align the point clouds of an image at an object orientation with another image at a different object orientation. PCL can be used to coarsely align the point clouds by a rotation range (e.g., 10-180 degrees). Although PCL is described as rotating point clouds by a range of 10-180 degrees, examples of the present disclosure are not so limited. For example, PCL can be used to align the point clouds by a smaller rotation (e.g., less than 10 degrees) or by a larger rotation (e.g., greater than 180 degrees).

Aligning the point clouds from the images corresponding to each different object orientation can include revising the rotation of the point clouds of two or more of the images to minimize a distance between the point clouds. For example, an iterative closest point (ICP) approach or other approach can be used to refine alignment of the point clouds. For example, ICP can be used to align point clouds by a rotation range relative to PCL (e.g., 1-3 degrees). Although ICP described as rotating point clouds by a range of 1-3 degrees, examples of the present disclosure are not so limited. For example, ICP can be used to align the point clouds by a rotation less than 1 degree or by a rotation greater than 3 degrees.

In some examples, the method 490 can include selecting a first image and a second image from the sequence of images from the capture cycle of the scanner, as described herein. The method 490 can, in some examples, include rotating a 3D object within a single plane at a fixed angle relative the scanner during the capture cycle, for example, rotating the 3D object by 360 degrees within a single plane at a fixed angle relative the scanner.

In some examples, the method 490 can include aligning a sequence of images based on the combined metadata and the metadata of the third image without other metadata of other images included in the sequence of images. For example, a capture cycle including six images taken at different object orientations along 360 degrees of rotation of a 3D object of the images selected as a first image, second image, and third image, as described herein, can be used to align the sequence of six images. Put another way, metadata from three of the six images can be used to align the images without metadata from any of the other three images. In such an example, aligning the sequence of images based on three of the six images, in contrast to other approaches that may utilize each of the six images, provides efficient and accurate alignment while accounting for object occlusion.

As used herein, "logic" is an alternative or additional processing resource to perform a particular action and/or element described herein. Logic can include hardware. The hardware can include processing resources such as circuitry, which are distinct from machine readable instructions on a machine readable media. Further, as used herein, "a" or "a plurality of" something can refer to one or more such things. For example, "a plurality of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed:
1. A system, comprising:
a select engine to select a first image and a second image from a sequence of images of a three-dimensional (3D) object taken at different object orientations from a same capture cycle of a scanner, wherein selecting the first image and the second image from the sequence of images is based on an alignment of a point cloud of the first image with an alignment of a point cloud with the second image;
a combine engine to combine first metadata from the first image and second metadata from the second image to form combined metadata;
an orientation engine to select a third image from the sequence of images, wherein the third image is from an opposite object orientation relative to a first object orientation of the first image or a second object orientation of the second image; and
an align engine to align the sequence of images based on the combined metadata and third metadata from the third image without metadata from other images included in the sequence of images from the same capture cycle.

2. The system of claim 1, wherein the first image and the second image are from adjacent object orientations.

3. The system of claim 1, comprising a model engine to generate a 3D model of the 3D object using the aligned sequence of images.

4. The system of claim 1, wherein the combined metadata includes metadata representative of respective geometries of the 3D object as viewed from the first object orientation and the second object orientation.

5. The system of claim 1, wherein the same capture cycle comprises a sequence of at least six different object orientations.

6. The system of claim 1, wherein a total number of object orientations included in the same capture cycle is an even number.

7. The system of claim 6, wherein the opposite object orientation is about 180 degrees of rotation along the same capture cycle from the first object orientation or the second object orientation.

8. The system of claim 1, wherein the scanner includes:
a depth-sensor camera; and
a red, green, and blue (RGB) camera.

9. A non-transitory computer readable medium storing instructions executable by a processing resource to cause a computing device to:
receive a sequence of images of a three-dimensional (3D) object taken at different object orientations from a same capture cycle of a scanner;
select a first image and a second image from the sequence of images, wherein selecting the first image and the second image from the sequence of images is based on an alignment of a point cloud of the first image with an alignment of a point cloud with the second image;
combine metadata of the first image with metadata of the second image to form combined metadata;
select a third image from the sequence of images from an opposite object orientation relative to a first object orientation of the first image or a second object orientation of the second image;
align an image of the sequence of images based on the combined metadata and metadata of the third image without metadata from other images included in the sequence of images from the same capture cycle; and generate at least a portion of a 3D model of the 3D object using the aligned sequence of images.

10. The medium of claim 9, wherein the instructions to align include instructions to rotate and translate a point cloud of an image of the sequence of images by a rotation angle matrix determined based on the combined metadata and the metadata of the third image.

11. The medium of claim 9, wherein the instructions to select the first image and the second image include instructions to select two images from the sequence of images having a desired alignment.

12. A method, comprising:

selecting a first image and a second image from a sequence of images of a three-dimensional (3D) object taken at different object orientations from a same capture cycle of a scanner, wherein selecting the first image and the second image from the sequence of images is based on an alignment of a point cloud of the first image with an alignment of a point cloud with the second image;

receiving first metadata of the first image of the 3D object at a first object orientation and second metadata of the second image of the 3D object at a second object orientation adjacent to the first object orientation along a sequence of object orientations corresponding to the sequence of images from the same capture cycle of the scanner;

combining the first metadata and the second metadata to form a combined metadata;

receiving third metadata from a third image of the 3D object at a third object orientation opposite from the first object orientation or the second object orientation; and aligning the sequence of images to generate at least a portion of a 3D model of the 3D object based on the combined metadata and the third metadata without metadata of other images included in the sequence of images from the same capture cycle.

13. The method of claim 12, comprising selecting the third image from the sequence of images from the same capture cycle of the scanner.

14. The method of claim 12, comprising rotating the 3D object within a single plane at a fixed angle relative the scanner during the same capture cycle.

15. The system of claim 1, wherein selecting the first image and the second image further comprises selecting two images from the same capture cycle that use the least amount of rotation of the point clouds of the two images to align the two images.

\* \* \* \* \*